P. F. SILBERMAN.
FAUCET ATTACHMENT OR FIXTURE.
APPLICATION FILED JULY 1, 1915.

1,217,512.

Patented Feb. 27, 1917.

Witness:
R. Bauerle

Inventor:
Philip F. Silberman
by Charles S. Mehor
Atty.

UNITED STATES PATENT OFFICE.

PHILIP F. SILBERMAN, OF CHICAGO, ILLINOIS.

FAUCET ATTACHMENT OR FIXTURE.

1,217,512.

Specification of Letters Patent. Patented Feb. 27, 1917.

Application filed July 1, 1915. Serial No. 37,422.

*To all whom it may concern:*

Be it known that I, PHILIP F. SILBERMAN, a citizen of the United States, residing at Chicago, in the county of Cook and State of Illinois, have invented certain new and useful Improvements in Faucet Attachments or Fixtures, of which the following is a specification.

This invention relates to faucet attachments or fixtures and is designed for use in conjunction with two water faucets, as are usual for the delivery of hot and cold water.

The present invention has for its object the provision of a means for utilizing scrap soap for the purpose of delivering from the fixture or attachment soapy water of any desired temperature, said stream of soapy water being in the form of a spray, which spray may be directed over an enlarged area due to the adjustment of the attachment. It is further possible to deliver the water from either faucet directly, without removing the attachment.

With the above and other objects in view, as will be hereinafter apparent, this invention consists in the construction, combination and arrangement of parts all as hereinafter more fully described, claimed and illustrated in the accompanying drawings, wherein—

Figure 1:
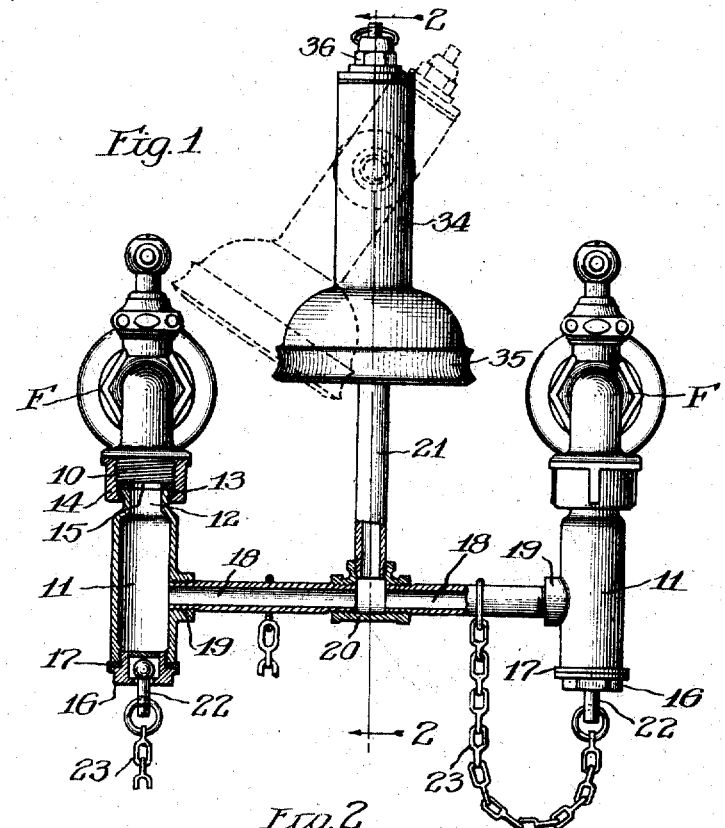
Figure 1 is a front elevation partly in section, illustrating the present invention in conjunction with two faucets of standard type.
Figure 2:
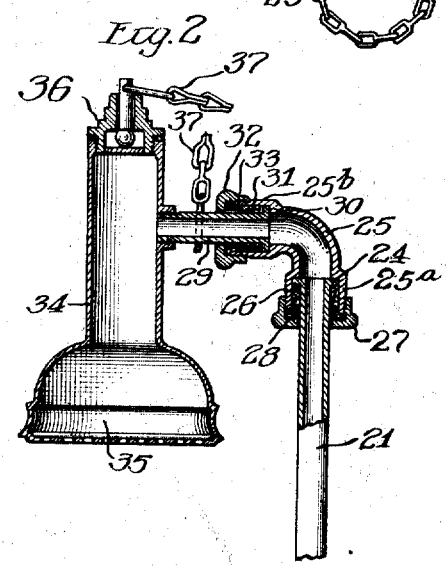
Fig. 2 is a vertical section along line 2—2 of Fig. 1, and illustrates the soap container and the means whereby the same is provided with a vertical and a horizontal swing or adjustment.

Reference being had more particularly to Figs. 1 and 2 of the drawings, F represents a pair of standard faucets such as are in common use, said faucets being provided with the threads 10 at their discharge ends. Coöperating with each faucet F and designed to communicate therewith is a faucet extension 11. The upper end of the faucet extension 11 is provided with a contraction 12, which terminates in a shoulder 13. A coupling 14 is loosely mounted on the contraction 12 below the shoulder 13, and is arranged to be threaded on the threads 10 of the coöperating faucet F, thereby securing the faucet extension 11 to said main faucet. A suitable washer 15 is interposed between the shoulder 13 and the discharge end 10 of the faucet, thereby preventing any leakage. The lower end of the faucet extension 11 is open, but may be closed by a cap 16 carrying a washer 17, said cap being threaded into the lower end of the faucet extension 11.

A horizontal section of pipe 18 communicates with the interior of the faucet extension 11 and is threaded into a bushing 19 in one side thereof. The pipes 18 of the two faucet extensions 11 extend toward one another in the same horizontal plane and are threaded into the end openings of a three-way union 20.

A vertical delivery pipe 21 is also threaded into the three-way union 20 and communicates with the pipes 18 and thence to the faucet extensions 11, so that a flow of liquid from the faucets F will be delivered to the faucet extensions 11 and the pipes 18, after which the two streams intermingle in the vertical pipe 21.

Each cap 16 has a pin 22 swiveled therein, to which is secured a chain 23 whereby the cap is attached to the corresponding pipe 18 to prevent displacement of the caps.

The upper terminal of the delivery pipe 21 is provided with an outstanding circumferential flange 24, which is received in the enlarged terminal 25ᵃ of the elbow union 25. Suitable packing 26 surrounds the pipe 21 adjacent to the shoulder of flange 24, and is held in place by a coupling 27, which is loosely mounted on the pipe 21 and arranged to be threaded onto the enlarged terminal 25ᵃ of the elbow union 25. This coupling is provided with an inwardly extending flange 28 which not only compresses the packing and holds it in place to prevent leakage, but at the same time permits the elbow 25 to swing about the pipe 21 as an axis. The opposite enlarged end 25ᵇ of the elbow 25 receives the terminal of a horizontal section of pipe 29, which is likewise provided with an outstanding circumferential flange or shoulder 30 at its inner end. Packing 31 surrounds the inner terminal of the pipe 29 below the flange 30, and is held in place by a coupling 32 threaded on the enlarged outer end 25ᵇ of the elbow 25. This coupling 32 is also provided with an inwardly extending flange 33, which compresses the packing 31 to prevent leakage, and at the same time permits the pipe 29 to rotate about its longitudinal axis within the coupling 32.

Threaded to and communicating with the section of pipe 29 is a container 34, open at its upper end and terminating at its lower end in the enlarged shower head 35.

The upper or open end of the container 34 is provided with a cap 36 held by a chain 37 extending to the section of pipe 29, said cap being removably threaded into the upper end of said container to act as a closure therefor but at the same time permitting soap or other substance to be placed within the container.

Manifestly, the water or liquid delivered from the faucets F through the faucet extensions 11, the pipes 18 to the vertical pipe 21, passes through the elbow 25, the section of pipe 29 and through the container 34. This flow of water mingles with the soap in the container and the enlarged shower head 35, through which latter it is delivered in a soapy spray. By the connections between the elbow 25 and the pipes 21 and 29, the container 34 is permitted to swing in a vertical as well as a horizontal plane, thereby increasing the surface over which the spray from the shower head 35 may be directed. If, however, it is desired to obtain clear water, the caps 16 of the auxiliary faucets 11 may be removed, permitting direct delivery of the water from the faucets F through the faucet extensions 11, without passing through the pipes 18, 21 and 29.

In all of the forms of the invention the container 34 and its connection with the vertical delivery pipes 21, 21′ and 21″ is the same, the invention varying only in the means of attaching the fixture to the faucet.

It is obvious that the length of the delivery pipe 21, may be varied, as also the length of the horizontal section of pipe 29, to meet the requirements of the invention in its many varied uses. It is apparent that this fixture or attachment may be used in any connection where it is desirable to deliver a quantity of fluid mixed with soap or any other ingredient over an extended area, to-wit, in barber shops, kitchens, laundries and, in fact, anywhere where a fresh and clean supply of soapy water is desired.

The universal adjustment of the container 34 increases the utility of the fixture, in that it vastly increases the area over which the spray may be delivered, and at the same time permits of swinging the container to one side, out of the way.

What is claimed is:

1. The combination with a vertical pipe, of a transverse pipe connecting with the lower end thereof, an extension connected with each end of said transverse pipe and extending on each side thereof, means for removably securing the upper ends of said extensions to faucets, and removable closures for the lower ends of said extensions.

2. The combination with a vertical standpipe, of a container terminating in a shower head, a connection between said container and said standpipe whereby the former always rests in a plane parallel to the latter and may swing in a horizontal and a vertical plane about the latter, a transverse pipe communicating with the opposite end of said vertical standpipe, and extensions at the ends of said transverse pipe.

3. The combination with a vertical standpipe, of a container terminating in a shower head, a connection between said container and said standpipe whereby the former always rests in a plane parallel to the latter and may swing in a horizontal and a vertical plane about the latter, a transverse pipe communicating with the opposite end of said vertical standpipe, a vertical extension at each end of said transverse pipe, means at the upper ends of said extensions for removably securing the same to faucets, and removable closures for the lower ends of said extensions.

4. The combination with a container terminating in a large shower head, of means for supplying fluid to said container comprising a vertical standpipe resting approximately parallel to said container, a connection between said standpipe and said container whereby the container may swing in a vertical as well as horizontal plane, a transverse supply pipe communicating with the lower end of said standpipe, and a transverse extension at the terminals of said supply pipe adapted to removably engage faucets.

5. The combination with a vertical pipe, of a transverse pipe connected with the lower end thereof, an extension connected with each end of said transverse pipe and extending on each side thereof, means for removably securing the upper ends of said extensions to faucets, and removable closures for the lower ends of said extensions whereby when in their operative position, the flow of fluid from the faucet may be directed into the transverse and vertical pipes aforesaid.

In testimony whereof, I have hereunto set my hand this the 26th day of June, 1915.

PHILIP F. SILBERMAN.

Witnesses:
WILLIAM P. MEYERS,
CHARLES S. WILSON.